Sanderson & De Barry,
Manf. Door Knobs &c.

No. 99,241. Patented Jan. 25. 1870.

Witnesses:
Adolphe Bork
C. McCully

Inventor:
Sanderson & De Barry
By atty.
S. M. Lutie

UNITED STATES PATENT OFFICE.

WILLIAM SANDERSON AND JAMES J. DE BARRY, OF NEW YORK, N. Y.

IMPROVEMENT IN THE MANUFACTURE OF DOOR-KNOBS, UMBRELLA-HANDLES, AND OTHER MOLDED ARTICLES.

Specification forming part of Letters Patent No. 99,241, dated January 25, 1870.

*To all whom it may concern:*

Be it known that we, WM. SANDERSON and JAS. J. DE BARRY, of New York city and county, in the State of New York, have invented certain new and useful Improvements in Manufacture of all Sorts of Molded Articles; and we do hereby declare that the following is a full and exact description thereof, reference being had to the accompanying drawings, making part of this application.

Our invention relates to a new manufacture of that class of articles which is usually molded out of some suitable composition while in a plastic state, and which becomes hard after compression between dies and becoming dry.

Previous to our invention it has been customary to manufacture composition door and other knobs, handles for umbrellas, and various handled instruments, checks for restaurants, and a great variety of articles, out of some suitable composition molded or compressed between proper dies into the desired shape, and with any desired design or configuration of surface; but in the use of all such articles experience has shown that there is more or less liability of chipping off and mutilation of the article by reason of the fragile nature of all such composition articles and their non-capacity to withstand the wear and tear of every-day use.

Our invention has for its object to provide a new article of manufacture adapted to all the uses to which compressed or molded compositions are now put, and which shall be comparatively indestructible, and present a surface or exterior equally desirable in appearance to the composition articles now generally manufactured; and to these ends our invention consists in forming various articles of any suitable composition molded between dies in the usual manner, but having its exterior wholly or partially covered with sheet metal compressed into shape to match the contour and design of the surface to which it is applied and securely united therewith, as hereinafter more fully explained, whereby such articles are rendered more durable and desirable.

To enable those skilled in the art to make and use our invention, we will proceed to describe the same more fully, referring by letters to the accompanying drawings, in which—

Figure 1:
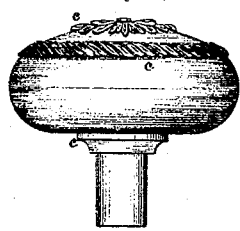
Figure 2:
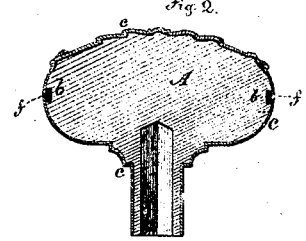
Figure 3:
Figure 5:
Figure 4:

Figure 1 is an elevation of an ordinary door-knob made according to our invention. Fig. 2 is a section of the same. Fig. 3 is an elevation of an umbrella-handle; Fig. 4, a section of the same. Fig. 5 is a face view, and Fig. 6 a section, of a check such as used generally in eating-saloons and other places.

In the several figures the same letters indicate the same part.

In Figs. 1 and 2, A is the composition body of the knob, which is composed of any suitable composition, and is molded into shape between the usual dies employed for such purposes, and under the requisite pressure to insure the proper degree of density and hardness. $b$ is a belt or band of suitable metal, which is either applied to and secured in a proper seat formed in the composition body A, or applied and secured in the position shown in said body A while the latter is in the dies, and simultaneously with the operation of molding the said body in said dies. $c$ is a jacket or envelope of thin sheet metal, which is made of two pieces or portions, the edges of which come together at and over the external face of the metallic belt $b$, and are there soldered together, so that when finished the molded article will present a metallic surface, which may be plated, galvanized, or otherwise finished up to suit the taste of the manufacturer, and render it desirable in appearance for the purposes for which it is intended. The two parts of the metallic jacket or covering may be struck up separately in dies to match the surfaces to which they are to be applied, or the thin sheet metal may be placed in the same dies with the composition and molded up with the latter under compression, and then be soldered at the joint and finished up.

The details of manufacture will be readily employed in the judgment of the manufacturer, according to the nature of the materials employed and the character of the article being made.

If deemed expedient, the belt $b$ may be composed of soft metal, such as will render the joint self-soldering by the mere application of heat, and said belt may be made with a projecting rib or feather on its face, as seen at $f$, adapted to protrude or come in between the adjacent edges of the two parts of the metallic cover $c$, so as to produce a better joint and perfect union of the metallic portions.

At Figs. 3 and 4, G represents the composition body of a handle, such as made for umbrellas and sunshades, and *i* its metallic covering or jacket, which may be formed over and applied to the body G during the molding process, or as may be found expedient. Strips of metal *m m* should be applied, as shown, over the surfaces of which the edges of the halves of the metal jacket may be properly united. The object and necessity of the use of such metal strips arises from the impracticability of soldering the joints over and in direct contact with material or composition of which the body G is formed.

Figure 6:
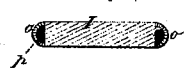

At Figs. 5 and 6, I is the body of a check molded out of some suitable composition. *o* is a metallic band covering its edge or periphery and portions of its faces. The band or rim *o* is molded around the body I and soldered at *p* over the metal surface of a block molded in at this point, as shown. (See Fig. 6.)

In the application of our invention to some kinds of articles—as, for instance, the checks—it may be deemed expedient to incase or cover only a portion of the surface—viz., that part which alone would be liable to chip or break off—and it will be understood that the advantages of the combination of the metal surface with the composition core or body may be derived as well in many cases by a partial covering only of the surface or exterior of the composition as by completely enveloping it.

It will be seen that by our invention all sorts of composition articles now manufactured may be rendered, at a very slight cost, much more durable and desirable, and it will be understood that the details of the manufacture or manipulation of the processes of molding and combining the composition and metallic portions of the article may be varied at the discretion of the experienced workman without departing from the gist of our invention, which rests on the idea of a metallic surface (either wholly or partially covering the surface of the composition) combined in a secure manner with the composition body, and conforming to the requisite design, so as to strengthen and render more durable the thing molded and at the same time beautify the article. For many articles of manufacture, such as have to be exposed to the weather, for instance, it is desirable to have the entire surface metallic on account of the liability of the composition to become defaced by such exposure.

Of course our invention may be applied in a great variety of cases and under numerous modifications. We therefore wish to be understood as not limiting our claim to any of the precise details shown, neither do we wish to be understood as laying any claim to such an article or mode of manufacture as that in which a metallic case is filled in with some soft or liquid material which afterward becomes hard or solid and constitutes a core; but What we do claim as our invention, and desire to secure by Letters Patent, is—

1. As a new manufacture, articles of various designs, formed of any suitable composition, and having metallic surfaces applied, substantially as and for the purposes set forth.

2. The employment, in connection with any composition article and a metallic (partial or entire) surface-covering, of inserted metallic soldering surface or surfaces, substantially as and for the purposes specified.

In testimony whereof we have hereunto set our hands and seals.

WM. SANDERSON. [L. S.]
JAMES J. DE BARRY. [L. S.]

In presence of—
T. B. BEECHER,
J. McINTIRE.